United States Patent
Lee

(10) Patent No.: US 8,240,323 B2
(45) Date of Patent: Aug. 14, 2012

(54) RAIN SHIELDING DEVICE FOR USE WITH AN AUTOMOBILE

(75) Inventor: Chih-Chung Lee, Yi-Lan-Shian (TW)

(73) Assignee: Ann Show Co., Ltd., Yi-Lan, Yi-Lan-Shian (TW)

( * ) Notice: Subject to any disclaimer, the term of this patent is extended or adjusted under 35 U.S.C. 154(b) by 222 days.

(21) Appl. No.: 12/809,931

(22) PCT Filed: Dec. 25, 2008

(86) PCT No.: PCT/CN2008/002074
§ 371 (c)(1),
(2), (4) Date: Jun. 21, 2010

(87) PCT Pub. No.: WO2009/094838
PCT Pub. Date: Aug. 6, 2009

(65) Prior Publication Data
US 2010/0269873 A1    Oct. 28, 2010

(30) Foreign Application Priority Data
Dec. 28, 2007  (CN) ........................... 2007 1 0304633

(51) Int. Cl.
*E04H 15/06* (2006.01)
*B60J 3/00* (2006.01)
(52) U.S. Cl. ........ 135/88.07; 135/98; 135/20.1; 135/23; 160/63; 160/88; 296/152; 296/163
(58) Field of Classification Search ............... 135/88.01, 135/88.05, 88.07, 98, 20.1, 20.3, 23, 27, 135/29, 135; 160/49, 53, 88, 84.07; 296/136.12, 296/152, 163
See application file for complete search history.

(56) References Cited

U.S. PATENT DOCUMENTS

| | | | | |
|---|---|---|---|---|
| 345,183 | A * | 7/1886 | Smith | 160/53 |
| 1,057,310 | A * | 3/1913 | White | 49/60 |
| 1,126,293 | A * | 1/1915 | Ryder | 135/20.1 |
| 1,512,252 | A * | 10/1924 | Verduin | 49/60 |
| 2,736,375 | A * | 2/1956 | Rupert | 160/352 |
| 2,897,002 | A * | 7/1959 | Yovich | 296/95.1 |
| 2,910,078 | A * | 10/1959 | Schunck | 135/27 |
| 4,458,707 | A * | 7/1984 | Lindaman | 135/90 |
| 5,150,728 | A * | 9/1992 | Stark | 135/16 |

(Continued)

FOREIGN PATENT DOCUMENTS
CH           336559 A    2/1959

*Primary Examiner* — Winnie Yip
(74) *Attorney, Agent, or Firm* — Morris Manning & Martin LLP; Tim Tingkang Xia, Esq.

(57) ABSTRACT

A rain shielding device for an automobile includes an umbrella holder, an umbrella cloth, and a power accumulator. The umbrella holder includes a first edge column mounted on a vehicle door, a second edge column mounted on a vehicle body, a plurality of main umbrella sticks between the first edge column and the second edge column, and two interlock members. The umbrella cloth is covered on the umbrella holder. The power accumulator includes a movable member, a plurality of auxiliary umbrella sticks, and an energy-storing member. The interlock members move the movable member when the vehicle door opens, and then the movable member interacts with the auxiliary umbrella sticks to push the main umbrella sticks and umbrella cloth unfolding. The energy-storing member stores energy when the umbrella cloth unfolds and releases energy when the vehicle door is closed; thus provides an auxiliary force when the umbrella cloth folds/unfolds.

10 Claims, 10 Drawing Sheets

U.S. PATENT DOCUMENTS

| | | | |
|---|---|---|---|
| 5,287,871 A * | 2/1994 | Trice | 135/88.05 |
| 6,044,856 A | 4/2000 | Cano | |
| 6,640,868 B1 * | 11/2003 | Guggisberg | 160/84.07 |
| 6,715,504 B2 * | 4/2004 | Chen | 135/27 |
| 6,948,766 B1 | 9/2005 | Capote et al. | |
| 6,959,715 B2 * | 11/2005 | Siegel | 135/16 |

* cited by examiner

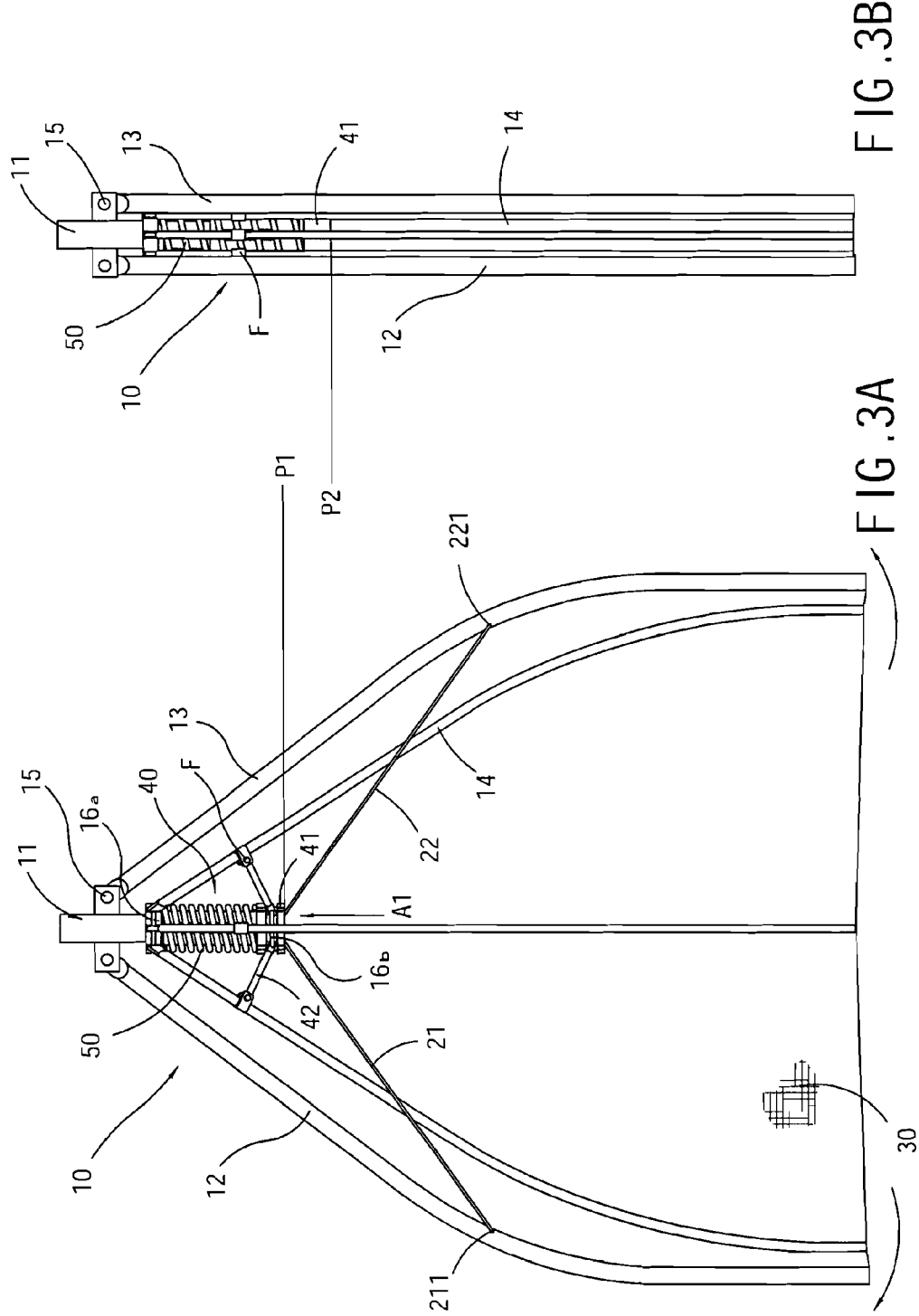

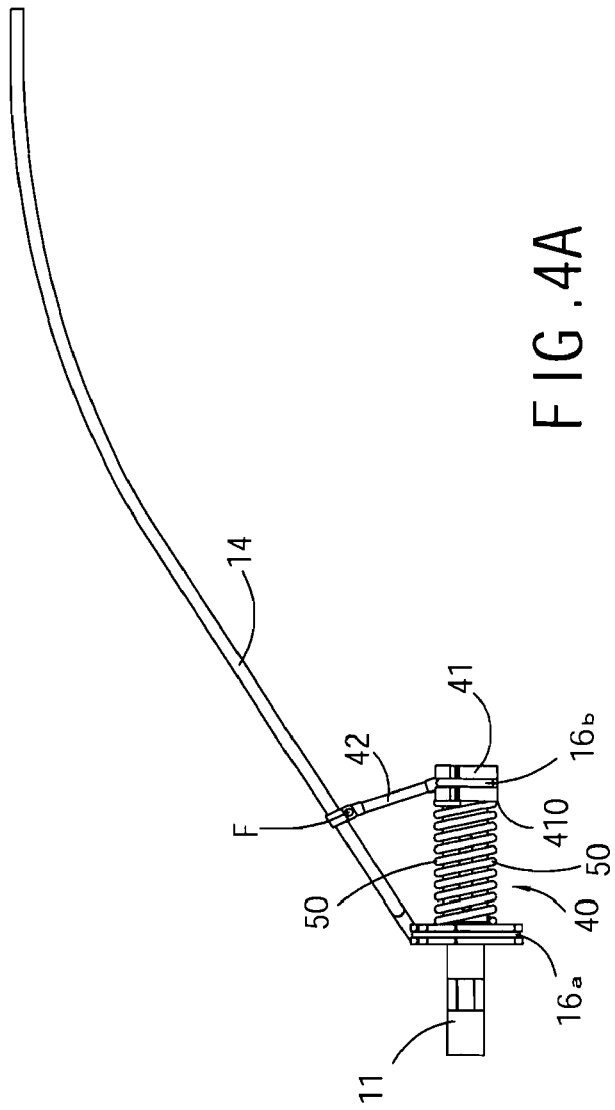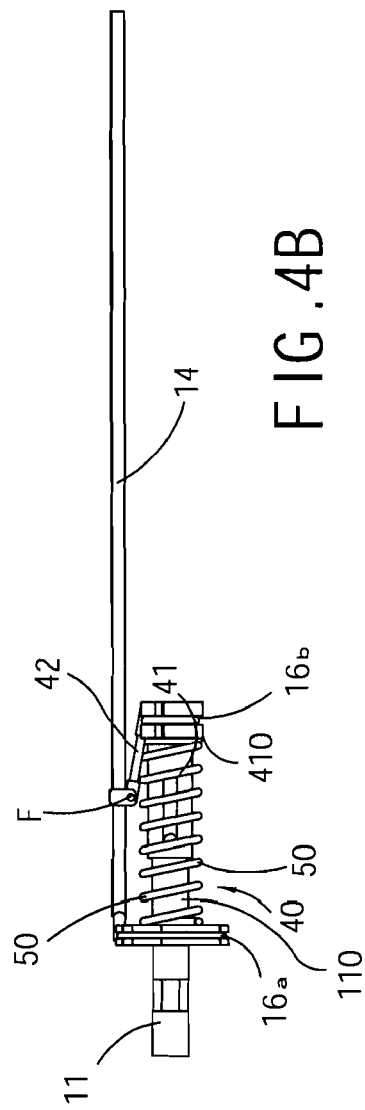

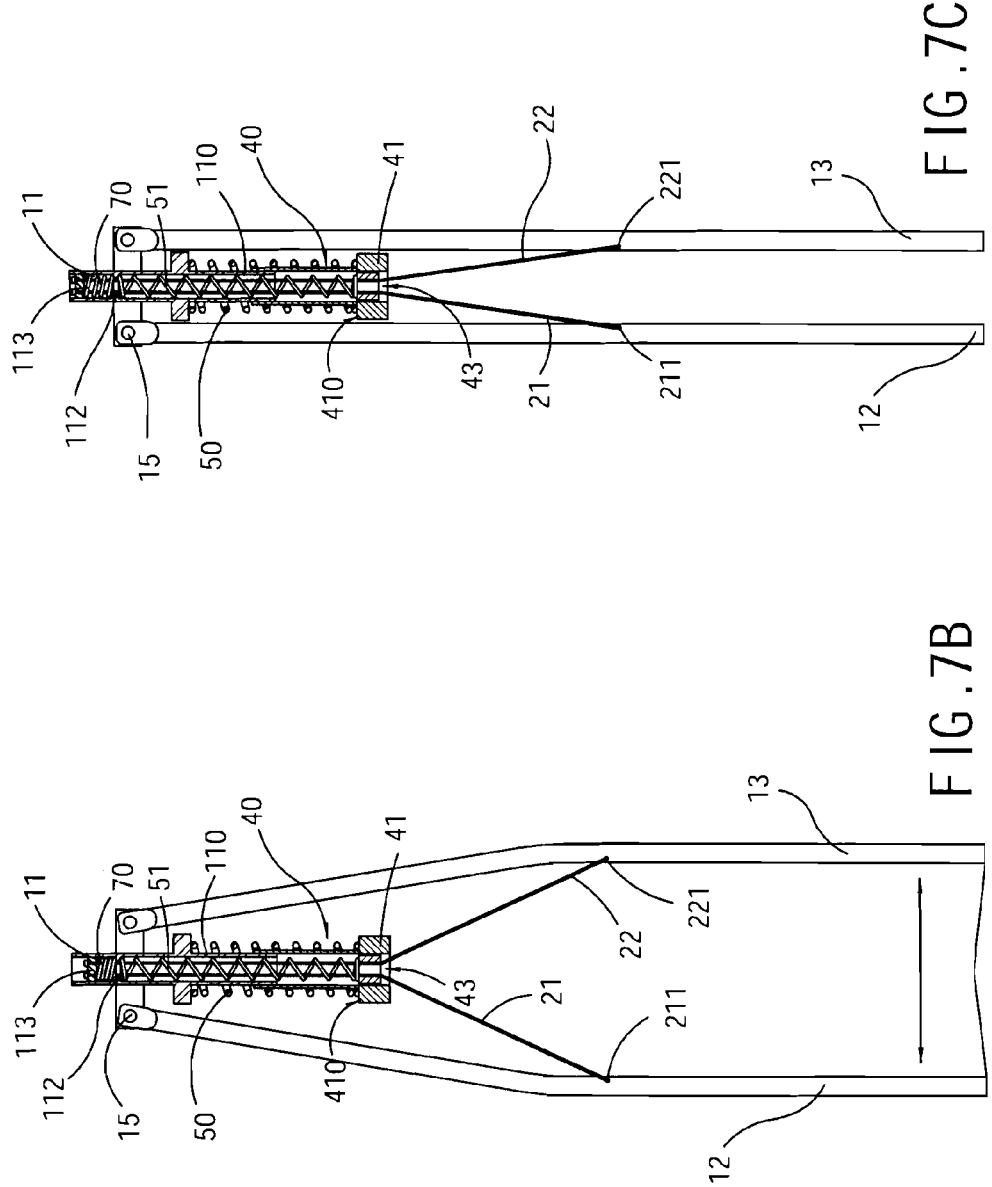

RAIN SHIELDING DEVICE FOR USE WITH AN AUTOMOBILE

BACKGROUND OF THE INVENTION

1. Field of Invention

The present invention relates to a rain shielding device, and more particularly to a rain shielding device mounted between an automobile vehicle body and a side swing door, which unfolds when the vehicle door opens and automatically folds when the vehicle door is closed.

2. Related Art

The automobile technology is changing rapidly, and the advanced and safe active or passive safety protection technology is always a great concern in the automobile design. With the changing of lifestyle, automobiles are not only the tools for transportation, but can also be regarded as a second home. Thus, besides the safety and performance, the conformability and convenience are main issues that consumers take into account.

Most automobiles in mass production are not equipped with the rain shielding device. When getting off the automobile in rain day, passengers always expand umbrellas quickly after opening the door but still get wet. A rain shelter for an automobile is received in an accommodation box, and is pulled out horizontally above the upper edge of the vehicle door when the door opens. Published U.S. Pat. No. 6,948,766 entitled "Protector for automobiles", U.S. Pat. No. 6,044,856 entitled "Rain shield canopy for use with an automobile" disclose the similar technology. Furthermore, a rain shielding device for use in getting on/off an automobile, which adopts a complicated gear mechanism and other mechanisms to extend the rain shelter.

Although the solution is set forth to solve the problem of getting wet when getting on/off the automobile in rain day, but the aforementioned prior art cannot provide a special and comfort head space. The rain shielding pulled out along the upper edge of the vehicle door is too low, which negatively influences the convenience in extending the umbrella. Also, the aforementioned prior art has a complicated configuration and is not easy to produce.

SUMMARY OF THE INVENTION

The present invention is a rain shielding device for an automobile, which automatically unfolds to shield raindrops when a passenger opens the vehicle door to get off the automobile, thereby sheltering the passenger from raindrops before unfolding an umbrella.

In an embodiment of the present invention, a rain shielding device is provided, which comprises an umbrella holder, an umbrella cloth, and a power accumulator.

The umbrella holder comprises a first edge column mounted on a vehicle door, a second edge column mounted on a vehicle body, a plurality of main umbrella sticks between the first edge column and the second edge column, and two interlock members.

The umbrella cloth is covered on the umbrella holder.

The power accumulator comprises a movable member, a plurality of auxiliary umbrella sticks, and an energy-storing member. The interlock members pass through the movable member, and drag the interlock members and cause motion of the movable member when the vehicle door opens, and thus the movable member interacts with the auxiliary umbrella sticks to push the plurality of main umbrella sticks unfolding in a radial direction, such that the umbrella cloth is unfolded to shield rain. The energy-storing member stores energy when the vehicle door opens and releases energy when the vehicle door is closed to push the movable member returning to the original position, thereby providing an auxiliary force when the umbrella cloth folds and meanwhile achieving the fast folding effect when the door is closed.

The present invention is a rain shielding device for an automobile with a simplified configuration. To achieve the objective, the rain shielding device of the present invention is mounted between the automobile vehicle door and the vehicle body, and preferably comprises an umbrella holder, a umbrella cloth covered on the umbrella holder, two interlock members, and a power accumulator, without using any complicated transmission mechanism or gear mechanism, thus achieving a simplified configuration with light weight.

The present invention is a rain shielding device for an automobile which is convenient in use. To achieve the objective, the present invention adopts the interlock members to convert the force when the vehicle door opens to a force for unfolding the umbrella holder and the umbrella cloth, and the power accumulator stores the force when the vehicle door opens so as to provide the force for folding the umbrella holder when the vehicle door is closed.

The present invention is a rain shielding device having a delay function. Based on this function, the umbrella holder and umbrella cloth unfold after the vehicle door opens slightly, and fold quickly on the closing of the vehicle door under the auxiliary force provided by the power accumulator, and thus the vehicle door can be closed smoothly, thereby achieving the effect of slowly unfolding and fast folding.

BRIEF DESCRIPTION OF THE DRAWINGS

The present invention will become more fully understood from the detailed description given herein below for illustration only, and thus are not limitative of the present invention, and wherein:

FIG. 3A shows the umbrella holder unfolds when the vehicle door of the automobile opens according to the rain shielding device for an automobile of the present invention.

FIG. 3B shows the umbrella holder folds when the vehicle door of the automobile is closed according to the rain shielding device for an automobile of the present invention.

FIG. 4A shows the main umbrella sticks unfold in radial direction towards the sky with the pivot joint seat as a center according to the rain shielding device for an automobile of the present invention.

FIG. 4B shows the main umbrella sticks fold with the pivot joint seat as a center according to the rain shielding device for an automobile of the present invention.

FIG. 7B shows the configuration of the rain shielding device for an automobile according to another embodiment of the present invention, illustrating the action of the detailed configuration of the pivot joint seat when the vehicle door opens slightly.

FIG. 7C shows the configuration of the rain shielding device for an automobile according to another embodiment of the present invention, illustrating the action of the detailed configuration of the pivot joint seat when the vehicle door is closed.

DETAILED DESCRIPTION OF THE INVENTION

The following embodiments of the present invention are only used to illustrate the objectives and embodiments of the present invention, and should not be regarded as limiting the scope of the present invention.

Figure 1:
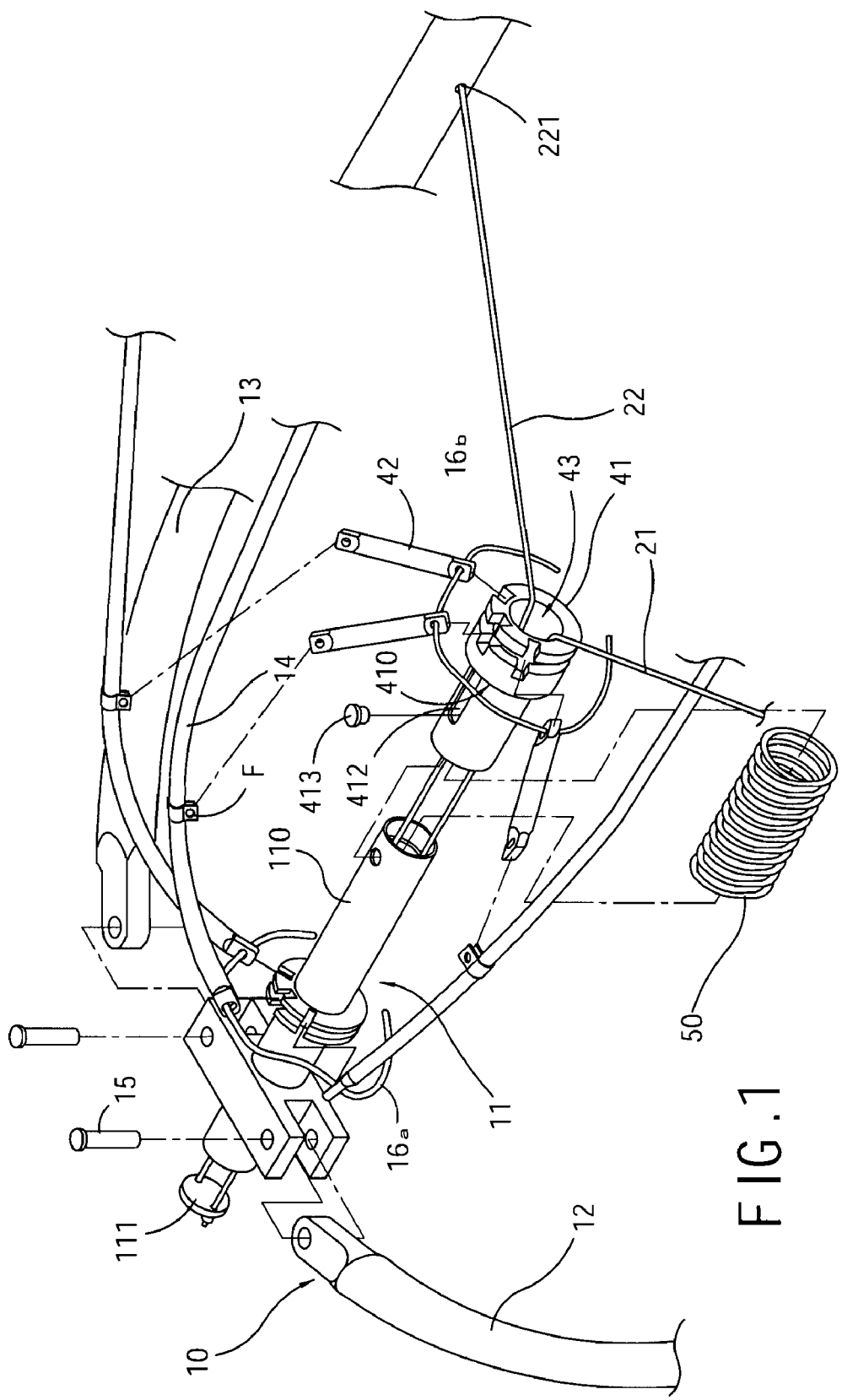
FIG. 1 shows a rain shielding device for an automobile according to an embodiment of the present invention.
Figure 2:
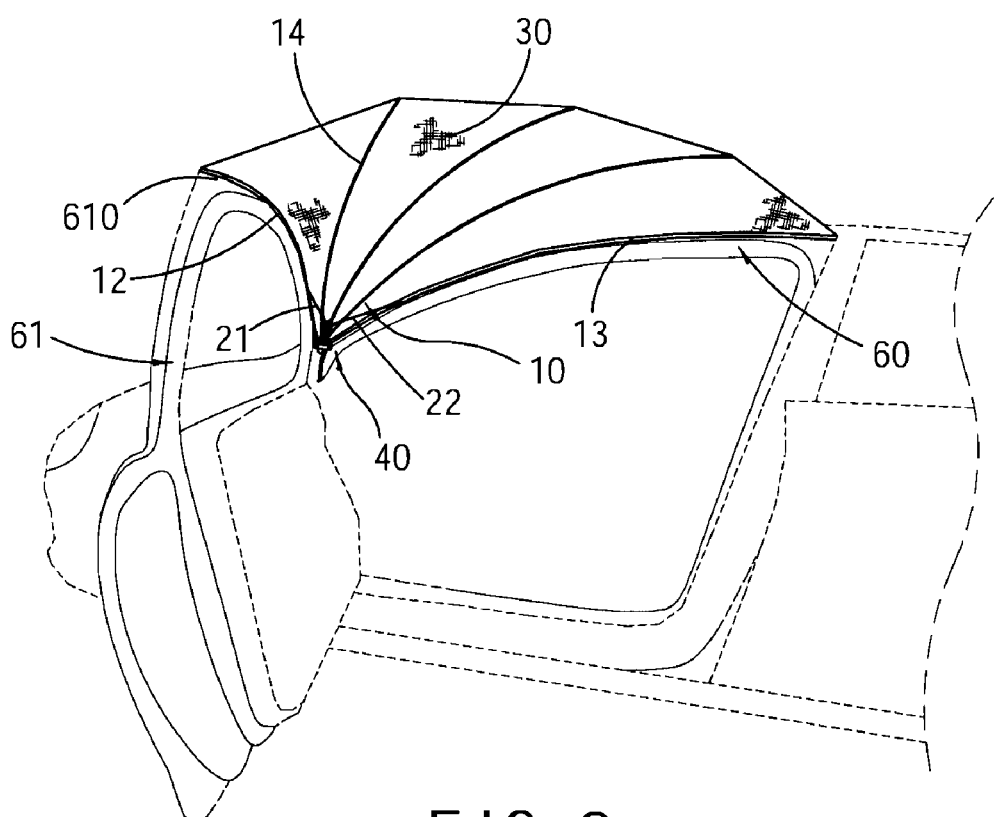
FIG. 2 shows a rain shielding device for an automobile mounted between the vehicle door and the vehicle body of the automobile according to the present invention.

Firstly, referring to FIGS. 1, 2, a rain shielding device for an automobile according to the first embodiment of the present invention is shown, which comprises an umbrella holder 10, at least two interlock members, an umbrella cloth 30, and a power accumulator 40.

The umbrella holder 10 has a pivot joint seat 11, a first edge column 12 with one end pivoted to the pivot joint seat 11, a second edge column 13 with one end pivoted to the pivot joint seat 11, a plurality of main umbrella sticks 14 between the first edge column 12 and the second edge column 13, in which the main umbrella sticks 14 each have one end pivoted to the pivot joint seat 11, and the main umbrella sticks 14 unfold or fold in a radial direction towards the sky with the pivot joint seat 11 as a center.

The at least two interlock members respectively are a first interlock member 21 and a second interlock member 22. The first interlock member 21 and the second interlock member 22 each have one end fixed to a fixed portion 111 of the pivot joint seat 11, and the other free end 211, 221 respectively connected to the first edge column 12 and the second edge column 13, and preferably the first interlock member 21 and the second interlock member 22 are wire rope, and the free ends 211, 221 (see FIG. 3A) pass through the first edge column 12 and the second edge column 13 and then are fixed.

The umbrella cloth 30 is covered on the umbrella holder 10 (see FIG. 2).

The power accumulator 40 has a movable member 41 which moves towards a first position P1 close to the pivot joint seat 11 or a second position P2 distant from the pivot joint seat 11 (see FIGS. 3A, 3B); a plurality of auxiliary umbrella sticks 42, each having one end pivoted to the movable member 11, and the other end pivoted to a point of force application F (the point of force application F is at a position between two ends of the main umbrella sticks 14 and close to the pivot joint seat 11) of the corresponding main umbrella stick 14; an energy-storing member 50, having one end in contact with the pivot joint seat 11, and the other end in contact with a flange 410 of the movable member 41. In other words, the energy-storing member 50 is disposed between the pivot joint seat 11 and the movable member 41, and the energy-storing member 50 stores energy during the movable member 41 moving towards a first position P1 and releases energy during the movable member 41 moving towards a second position P2, so as to provide an auxiliary force during the movable member 41 moving towards the second position P2.

In order to confine the movable member 41 moving between the first position P1 and the second position P2, practically, a longitudinal through hole 412 extending along the axial direction of the movable member 41 is arranged, and then a joining member 413 (for example, but not limited to, a rivet, a latch, or other equivalent members) passes through the longitudinal through hole 412 to join the movable member 41 and the hollow shaft 110 of the pivot joint seat 11, such that the action of the joining member 413 and the longitudinal through hole 412 confines the movable member 41 moving between the first position P1 and the second position P2.

In the present invention, the terminology "pivot" refers to connecting two members by means of an axle or a similar member to enable two members rotating relative to each other. For example, the first edge column 12 and the second edge column 13 are respectively pivoted to the pivot joint seat 11 by means of an axle 15, and the main umbrella sticks 14 and the auxiliary umbrella sticks 42 are respectively pivoted to the pivot joint seat 11 and the movable member 41 by metal wires 16a, 16b. In simple words, the method of the umbrella structure is adopted, and those skilled in the art can easily implement or substitute the present invention by other configuration having similar effect according to the technical features of the present invention. The aforementioned "pivot" configuration is only an embodiment of the present invention and should not be regarded as limiting the scope of the present invention.

Referring to FIG. 2, in the application of the present invention, the first edge column 12 is mounted on an upper edge 610 of the vehicle door 61, and the second edge column 13 is mounted on the vehicle body 60 at the position corresponding to the upper edge 610. In detail, when the vehicle door 61 is closed and approaches the vehicle body 60, the first edge column 12 and the second edge column 13 are close to each other and folded, and at the same time the main umbrella sticks 14 are received between the first edge column 12 and the second edge column 13 (see FIG. 3B). Preferably, adhesion or fixing members such as screws are used for fixing to the upper edge 610 and the vehicle body 60. Definitely, the first edge column 12 and the second edge column 13 may be respectively fixed to or embedded in the upper edge 610 and the vehicle body 60 during the production of the automobiles.

The aforementioned first edge column 12, second edge column 13, the plurality of main umbrella sticks 14, and auxiliary umbrella sticks 42 are preferably fabricated by a light and elastic material, for example, carbon fiber, fiber glass, aluminum rod, or other composite materials, thereby satisfying the requirements for light weight and thin size, so as to be received in a narrow space between the upper edge 610 and the vehicle body 60 after the vehicle door 61 is closed.

The umbrella cloth 30 may be an ordinary umbrella cloth for fabricating umbrellas or other light and water-proof fabrics for example, plastic cloth, and preferably a splash-resistant cloth. In addition to the above, the umbrella cloth 30 may be a transparent or opaque cloth, and preferably an elastic cloth having elasticity because the elastic cloth is easier to be received in the narrow space between the upper edge 610 and the vehicle body 60 when the main umbrella sticks 14 of the present invention fold.

According to an embodiment of the present invention, the energy-storing member 50 is a compression spring, and the movable member 41 is a hollow tubular member and has a hollow channel 43. The movable member 41 is fitted on a hollow shaft 110 of the pivot joint seat 11, and moves only along the axial direction of the hollow shaft 110 between the first position P1 and the second position P2. The first interlock member 21 and the second interlock member 22 each have one end passing through the hollow movable member 41 and fixed at the fixed portion 111 of the pivot joint seat 11 (the fixed portion 111 is fixed inside the hollow shaft 110). The movable member 41 having a flange 410 (see FIG. 4) confines the energy-storing member 50 between the movable member 41 and the pivot joint seat 11. According to the technical features of the present invention, those skilled in the art may easily substitute the movable member 41 and the energy-storing member 50 of the power accumulator 40 by equivalent members, for example, hydraulic elements, pneumatic elements or energy-storing members having elastic deformation property may be used to replace the compression spring. However, these obvious equivalent substitutions can be easily obtained according to the technical means of the present invention and falls into the scope of the present invention.

The first interlock member 21 and the second interlock member 22 are preferably wire ropes (for example, metal wires, metal chain, or nylon wire), and those skilled in the art can make equivalent substitution according to the technical features of the present invention.

Referring to FIG. 4A, the main umbrella sticks 14 of the rain shielding device unfold in a radial direction towards the sky with the pivot joint seat 11 as a center, and the motion principle is as shown in FIG. 3A. When the vehicle door 61 is closed and touches the vehicle body 60, the energy-storing member 50 releases energy, and specifically returns to the fully expanding state, for pushing the movable member 41 moving towards the second position P2. At this time, the movable member 41 drives the auxiliary umbrella sticks 42 to drag at the point of force application F the main umbrella sticks 14 to fold, and remain the state as shown in FIGS. 3B and 4B. Then, when a passenger opens the vehicle door 61, the first edge column 12 and the second edge column 13 unfold sectorially with the pivot joint seat 11 as the center. The free end 211 of the first interlock member 21 and the free end 221 of the second interlock member 22 are separated with the unfolding of the first edge column 12 and the second edge column 13 (see FIG. 3A), thereby producing a pushing force on the movable member 41 (see FIG. 3A, the direction indicated by arrow A1), which makes the movable member 41 to move towards the first position P1 close to the pivot joint seat 11. With the increase of the opening width of the vehicle door 61, the movable member 41 is closer to the first position P1. When the vehicle door 61 fully opens, the movable member 41 reaches the first position P1, and during the opening of the vehicle door 61, the movable member 41 urges the energy-storing member 50 to generate the compression deformation thereby storing energy. Meanwhile, the movable member 41 drives the auxiliary umbrella sticks 42 to push the main umbrella sticks 14 at the point of force application F, so the main umbrella sticks 14 unfold in a radial direction towards the sky with the pivot joint seat 11 as a center and present the state as shown in FIGS. 2 and 4A. As long as the vehicle door 61 is not closed, the main umbrella sticks 14 and the umbrella cloth 30 remain unfolding upwards between the vehicle door 61 and the vehicle body 60, thereby providing a head space for the passenger when getting off the automobile without feeling embarrassed.

Then, when the vehicle door 61 is closed, the energy-storing member 50 releases energy and specifically returns to the expanding state, thereby pushing the movable member 41 to move towards the second position P2. At this time, the movable member 41 drives the auxiliary umbrella sticks 42 to drag at the point of force application F the main umbrella sticks 14 to fold and finally reach the closed state as shown in FIGS. 3B and 4B.

Figure 5:
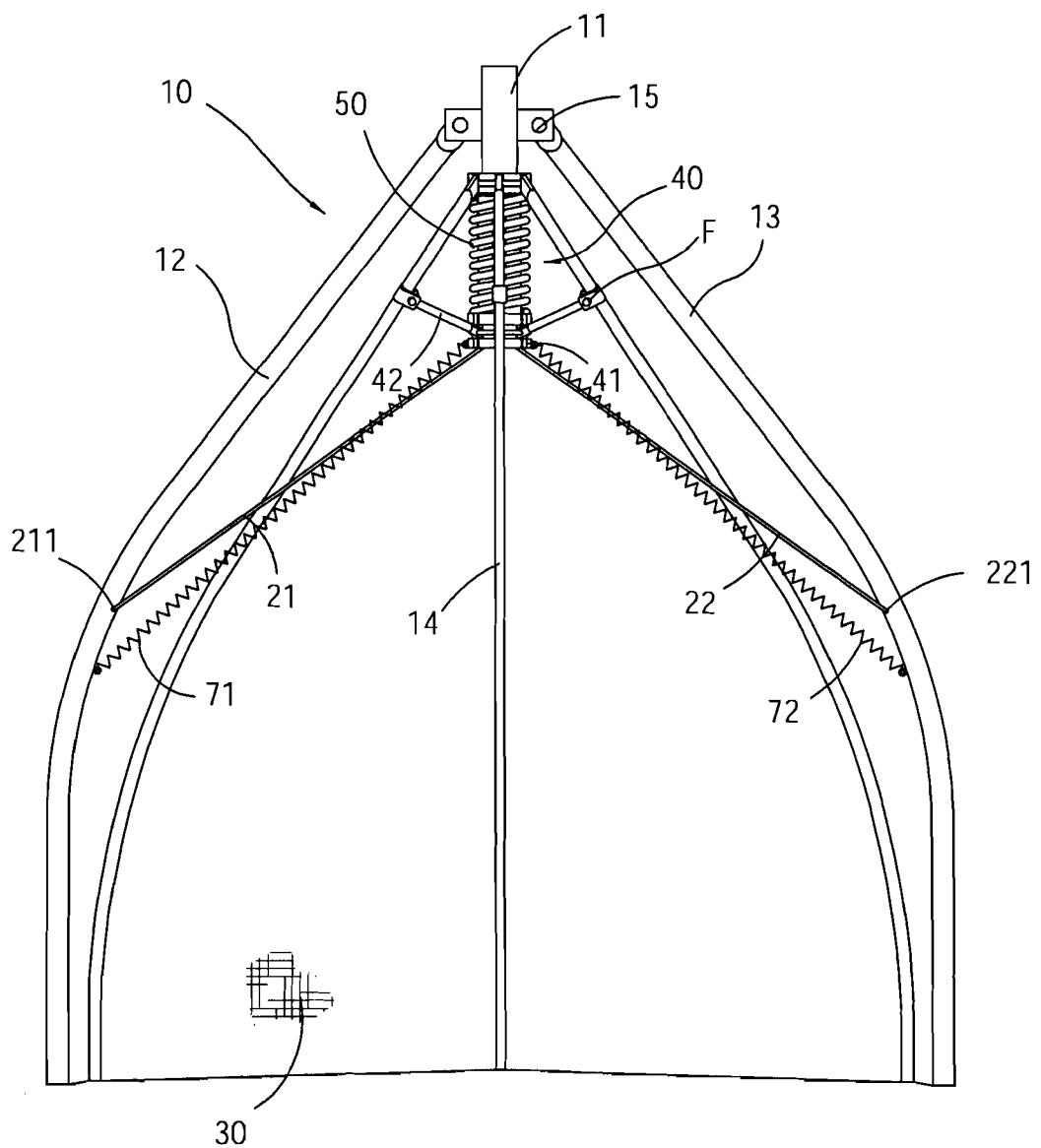
FIG. 5 shows the configuration of the rain shielding device for an automobile according to another embodiment of the present invention.

In an embodiment of the present invention as shown in FIG. 5, the present invention further comprises two extension springs, which respectively are a first extension spring 71 and a second extension spring 72. The first extension spring 71 and the second extension spring 72 each have one end fixed to the first edge column 12 and the second edge column 13, and the other end connected to the movable member 41. The first extension spring 71 and the second extension spring 72 expand when the vehicle door 61 opens. In other words, when the movable member 41 moves towards the first position P1, the movable member 41 drives the first extension spring 71 and the second extension spring 72 to expand, and the force produced after the first extension spring 71 and the second extension spring 72 are deformed is used as the auxiliary force for folding the main umbrella sticks 14 and the umbrella cloth 30. In an embodiment, the first extension spring 71 and the second extension spring 72 remain slightly expanding when the vehicle door 61 is closed, and thus the loose state will not occur.

Figure 6:
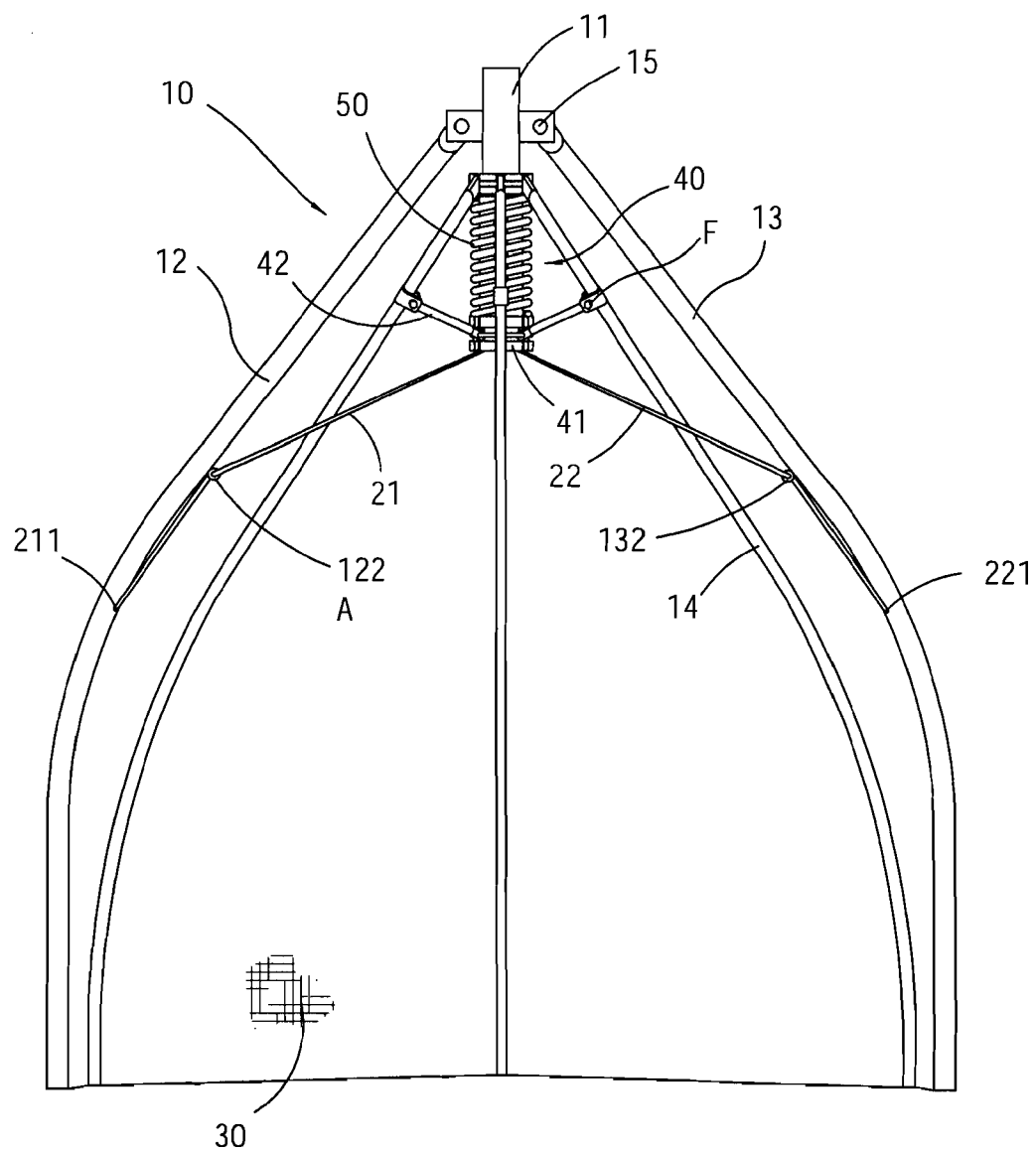
FIG. 6 shows the configuration of the rain shielding device for an automobile according to another embodiment of the present invention, illustrating the details of the delay configuration.

In another embodiment of FIG. 6, a delay configuration is disclosed, in which the first edge column 12 and the second edge column 13 are respectively provided with guiding members 122 and 132, for guiding the first interlock member 21 and the second interlock member 22 to move to the position close to the first edge column 12 and the second edge column 13 at two sides. Thus, the configuration of the rain shielding device is not too complicated, and in a simply manner, the annular member is used as the guiding members 122 and 132.

Figure 7A:
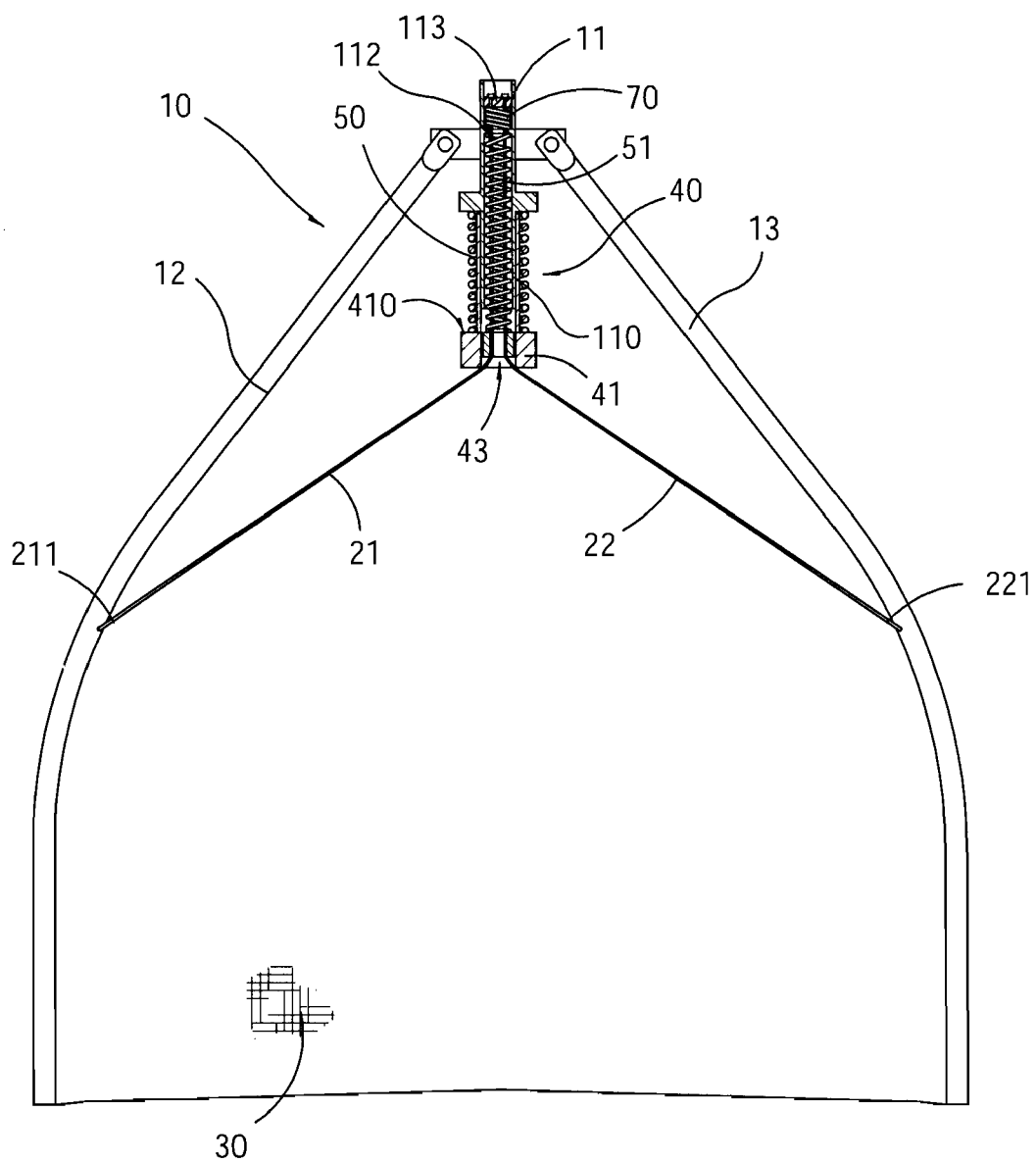
FIG. 7A shows the configuration of the rain shielding device for an automobile according to another embodiment of the present invention, illustrating the action of the detailed configuration of the pivot joint seat when the rain shielding device unfolds.

In another embodiment of the present invention as shown in FIGS. 7A, 7B, 7C, a detailed configuration of the pivot joint seat 11 is disclosed, which comprises an elastic member 70 disposed in the hollow shaft 110 of the pivot joint seat 11. The elastic member 70 may be a spring or other equivalent members, and is located between a piston 113 and an annular rib 112 on the inner wall of the hollow shaft 110. The piston 113 may slide inside the hollow shaft 110, and the first interlock member 21 and the second interlock member 22 each have one end fixed at the piston 113, as shown in FIG. 7C. When the vehicle door 61 is closed (the normal state), the elastic member 70 presents the expanding state. When the vehicle door 61 opens slightly to achieve the position as shown in FIG. 7B, the first interlock member 21 and the second interlock member 22 are respectively dragged by the first edge column 12 and the second edge column 13 to firstly drive the piston 113 to move in the hollow shaft 110 along the axial direction, and press the elastic member 70 to the inelastic state (see FIG. 7B). Then, after the vehicle door 61 opens wider, the opening force of the vehicle door 61 is transferred to the movable member 41 by the first interlock member 21 and the second interlock member 22, and further drives the movable member 41 to move towards the position P1 as shown in FIG. 3A and drives the auxiliary umbrella sticks 42. The auxiliary umbrella sticks 42 make the main umbrella sticks 14 and the umbrella cloth 30 unfold at the point of force application F.

Figure 8:
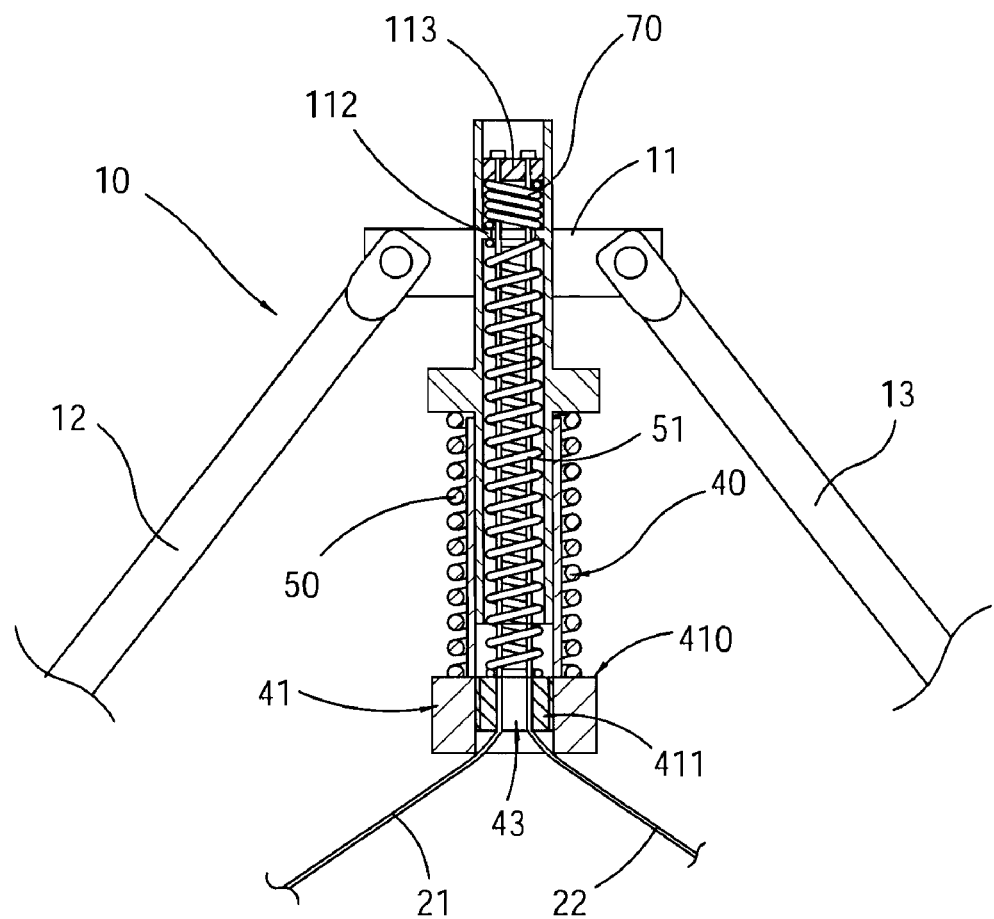
FIG. 8 shows partial configuration of FIG. 7A, illustrating the section configuration of the elastic member and the second energy-storing member.
Figure 9:
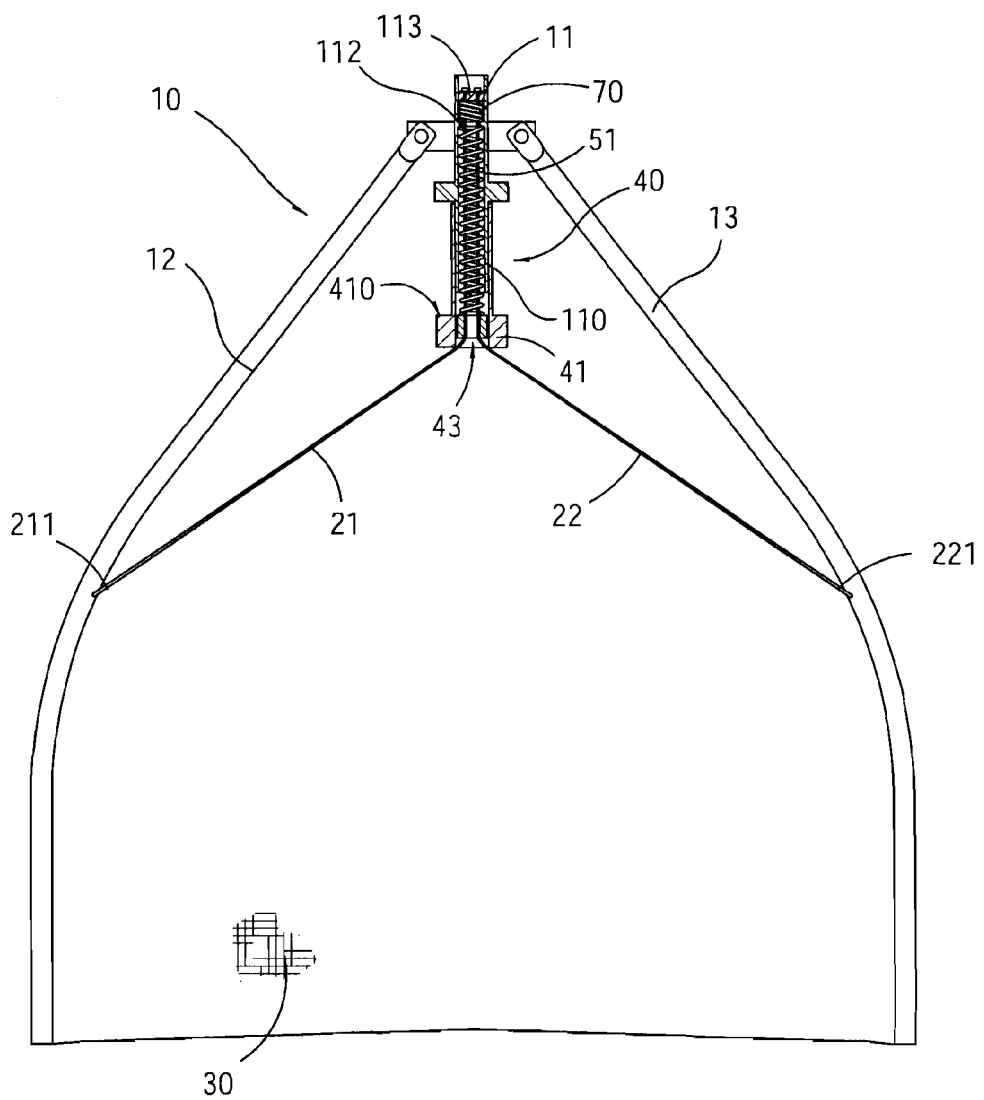
FIG. 9 shows the configuration of the rain shielding device for an automobile according to another embodiment of the present invention, illustrating another feasible configuration of the power accumulator.

In an embodiment of the present invention, a second energy-storing member 51 (see FIG. 8) is disposed in the hollow shaft 110 of the pivot joint seat 11. The second energy-storing member 51 and the first energy-storing member 50 have the same function (the second energy-storing member 50 may be a compression spring). One end of the second energy-storing member 51 is in contact with the annular rib 112 of the hollow shaft 110, and the other end of the second energy-storing member 51 is in contact with the movable member 41, and specifically is blocked by the barrier portion 411 in the channel 43 of the movable member 41. Therefore, when the vehicle door 61 opens and is closed, the second energy-storing member 51 functions similar to the energy-storing member 50 to store energy when the vehicle door 61 opens and release energy when the vehicle door 61 is closed, so as to provide a great auxiliary force for folding the main umbrella sticks 14 and the umbrella cloth 30. In principle, if the energy-storing member 50 as shown in FIG. 7A is removed and only the second energy-storing member 51 is disposed (see FIG. 9), the function of the power accumulator 40 of the rain shielding device does not change. In other words, if only the second energy-storing member 51 is left, the rain shielding device of the present invention can be used as normal and exerts the rain shielding function.

In view of the above, according to the rain shielding device of the present invention, the rain shielding device automatically unfolds before the passenger opens the door and getting off the automobile, thereby protecting the passenger from getting wet before unfolding the umbrella. Compared with the prior art, the present invention has a simplified configuration without using any complicated transmission mechanism or gear mechanism, thus achieving a simplified configuration with light weight. Further, the main umbrella sticks 14 and the umbrella cloth 30 unfold after the vehicle door 60 opens also provide a spacial head space for the passenger.

What is claimed is:

1. A rain shielding device for an automobile, comprising:
   an umbrella holder, having a pivot joint seat, a first edge column with one end pivoted to the pivot joint seat, a second edge column with one end pivoted to the pivot joint seat, a plurality of main umbrella sticks between the first edge column and the second edge column, wherein the main umbrella sticks each have one end pivoted to the pivot joint seat, and the main umbrella sticks unfold or fold in a radial direction towards the sky with the pivot joint seat as a center;
   at least two interlock members, each having one end fixed to the pivot joint seat and other free ends respectively connected to the first edge column and the second edge column; an umbrella cloth, covered on the umbrella holder; and
   a power accumulator, comprising a movable member, capable of moving to a first position close to the pivot joint seat or a second position distant from the pivot joint seat; a plurality of auxiliary umbrella sticks, each having one end pivoted to the movable member, and the other end respectively pivoted to a point of force application of the corresponding main umbrella stick; an energy-storing member between the pivot joint seat and the movable member, having one end in contact with the pivot joint seat and the other end in contact with the movable member, wherein the energy-storing member stores energy during the movable member moving towards the first position, and releases energy during the movable member moving towards the second position, so as to provide an auxiliary force during the movable member moving towards the second position.

2. The rain shielding device for an automobile according to claim 1, wherein the interlock members are selected from a group consisting of a wire rope and a metal chain.

3. The rain shielding device for an automobile according to claim 1, wherein the pivot joint seat has a hollow shaft, the movable member is a hollow tubular member and has a channel, the movable member is fitted on the hollow shaft of the pivot joint seat and moves only along an axial direction of the hollow shaft between the first position and the second position, the first interlock member and the second interlock member each have one end passing through the channel and the hollow shaft and then fixed to a fixed portion, and the fixed portion is fixed inside the hollow shaft.

4. The rain shielding device for an automobile according to claim 1, wherein the point of force application is between two ends of the main umbrella sticks and close to the pivot joint seat.

5. The rain shielding device for an automobile according to claim 1, wherein the energy-storing member is selected from a group consisting of a compression spring, a pneumatic element, a hydraulic element, or other energy-storing members having an elastic deformation property.

6. The rain shielding device for an automobile according to claim 1, further comprising two extension springs, wherein the extension springs each have one end respectively fixed to the first edge column and the second edge column, and the other end connected to the movable member, and the extension springs expand when the vehicle door opens and remains slightly expanding when the vehicle door is closed.

7. The rain shielding device for an automobile according to claim 1, further comprising a delay configuration, wherein the delay configuration comprises two guiding members respectively positioned at the first edge column and the second edge column, for guiding the first interlock member and the second interlock member to move to the position close to the first edge column and the second edge column at two sides.

8. The rain shielding device for an automobile according to claim 7, wherein the pivot joint seat comprises an spring disposed in a hollow shaft of the pivot joint seat, and the elastic member is located between a piston and an annular rib on the inner wall of the hollow shaft, the piston may slide inside the hollow shaft, and the first interlock member and the second interlock member each have one end fixed at the piston.

9. The rain shielding device for an automobile according to claim 7, wherein the pivot joint seat has a second energy-storing member disposed inside a hollow shaft of the pivot joint seat, one end of the second energy-storing member presses against a annular rib on the inner wall of the hollow shaft, the other end of the second energy-storing member is blocked by a barrier portion in the channel of the movable member, and the second energy-storing member stores energy when the vehicle door opens and releases energy when the vehicle door is closed.

10. The rain shielding device for an automobile according to claim 9, wherein the second energy-storing member is a compression spring.

* * * * *